T. A. BRYSON.
CENTRIFUGAL DRYING MACHINE.
APPLICATION FILED NOV. 28, 1914.
1,273,817.
Patented July 30, 1918.
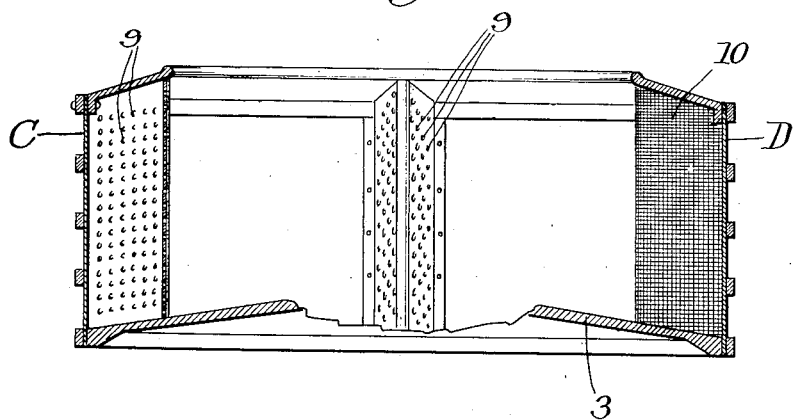
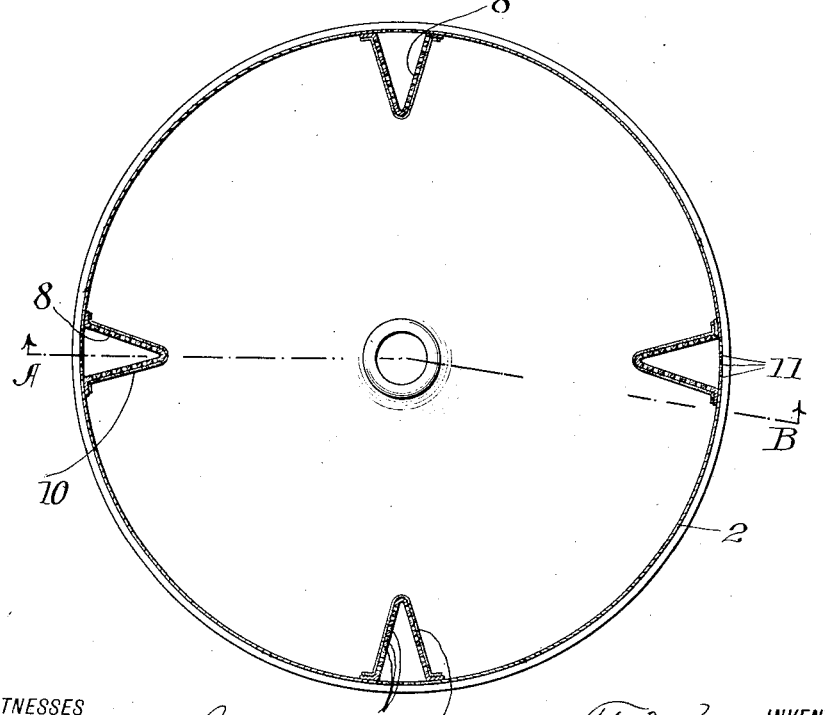
WITNESSES
INVENTOR
T. A. Bryson
BY John D. Morgan
ATTORNEY

UNITED STATES PATENT OFFICE.

TANDY A. BRYSON, OF TROY, NEW YORK, ASSIGNOR TO TOLHURST MACHINE WORKS, A CORPORATION OF NEW YORK.

CENTRIFUGAL DRYING-MACHINE.

1,273,817.  Specification of Letters Patent.  Patented July 30, 1918.

Application filed November 28, 1914.  Serial No. 874,487.

*To all whom it may concern:*

Be it known that I, TANDY A. BRYSON, a citizen of the United States, and a resident of Troy, New York, have invented new and useful Improvements in Centrifugal Drying-Machines, of which the following is a specification.

The invention relates to centrifugal hydro-extractors or driers and more especially to such machines for extracting moisture from dense, or finely divided, or minutely comminuted materials, such as clays, linseed oil foots, apple skins, and other substances. Objects and advantages of the invention will be set forth in part hereinafter, and in part will be obvious herefrom.

The invention consists in the novel parts, constructions, combinations and improvements herein shown and described.

The accompanying drawings herein referred to, and constituting a part hereof, illustrate one embodiment of the invention, and together with the description serve to explain the principles thereof.

Of the drawings:—

Figure 1 is a vertical section on line A—B of Fig. 2, with parts broken away, of a machine embodying the invention;

Fig. 2 is a full horizontal section on line C—D of Fig. 1, with certain known and nonessential parts omitted, corresponding to Fig. 1.

In the usual manner of filtering or dewatering most materials by centrifugal action, a filtering medium or instrumentality is placed at the peripheral walls of the cylindrical container. When two or more materials of different specific gravity are centrifuged, the heavier materials, usually a solid, will take its position in a layer upon the vertical peripheral wall of the container and the lighter material, usually a liquid, will take its position in a layer within such outer and relatively dense layer.

The drying or dewatering in such cases is effected by depending on the lighter liquid to find its way in a substantially radial direction through the minute interstices of the heavier material and out through the walls of the container. When the heavier material is relatively dense or minutely divided or comminuted, the lighter liquid within is hindered or entirely prevented from so passing out. A very thin layer of dense or finely divided material, such as clay, is sufficient to clog the filter, thus stopping the process and retaining a layer of liquid on the inner surface of such impervious wall. The dewatering is thus prevented or rendered economically inefficient.

By my invention, the filtering surface or moisture tapping device is positioned or extended in a general radial direction beyond or within the layer of denser and heavier material in the centrifugal machine to bring such surface or device into direct communication with the inner layer of liquid, and this liquid may then be carried or flowed away without passing through the outer and denser layer. By the action of centrifugal force, the inner wall or surface of the dense outer material will be in effect a level surface, and the liquid will be free to flow over it in a circumferential direction to an unobstructed outlet. Thus the material is quickly dewatered and the work is performed quickly, thoroughly and efficiently from an economic or commercial standpoint.

In the embodied form of mechanism, and referring to Fig. 1, a bowl or container 1 has vertical cylindrical side walls 2 and a bottom 3, and is preferably partly open at the top having an inwardly extending ring or annular plate and also may have a suitable closure if desired. The shaft for rotating the basket or container passes through the opening 5. The invention is herein applied to an intermittently operating centrifugal, that is, one which is stopped to unload and load, although in certain of its features the invention is applicable to other kinds of machines. In the embodied form, the interior is largely unobstructed affording great facility for loading and unloading.

A tapping or filtering device for flowing off the inner liquid layer, as already described, is provided. In the embodied form thereof, a vertically arranged wall 8 is fixed to the wall 2 of the bowl or container and is angled or returned back again to the wall 2, being preferably of V shape in horizontal section with the upper ends joining the periphery of the basket or container. There are preferably a plurality of the tapping or filtering devices 8, and they may be bolted or otherwise suitably fastened to the wall 2. Wall 8 is provided with openings for the filtering or passing through of the liquid. As embodied there are perforations 9 in the wall 8, and over the wall 8 is stretched or spread a sheet or layer 10 of wire gauze or other suitable foraminous material. The liquid is carried off from the other side of wall 8 by suitable means and for this purpose the wall 2 is preferably made perforate where inclosed by 8, as shown at 11. The liquid will thus flow in a circumferential direction through the openings in 8 and will then be thrown out by centrifugal action through the openings at 11.

In addition to the improved and advantageous way of treating the material and effecting the drying or dewatering, the mechanism is of simple form and requires no general changes in the usual form of centrifugal basket or container. It may also be easily and quickly applied to and removed from existing baskets, thus permitting the use of a single basket or container for different kinds of work and materials. Where the walls of a basket or container are perforate, the wall 2 may be an inserted thin inner wall of sheet metal. The mechanism is simple and inexpensive, and the greater part of the interior of the basket is left unobstructed for loading and unloading and for cleaning.

The invention in its broader aspects is not limited to the precise form shown and described, but variations may be made therein without departing from the principles of the invention and without sacrificing its chief advantages.

What I claim as my invention and desire to secure by Letters Patent is:—

1. A hydro-extracting machine including in combination a rotating bowl having an outer cylindrical wall for holding a relatively dense and impervious layer separated by the centrifugal action, and a plurality of walls, each joining with said cylindrical wall at both ends to form an inclosed recess, said walls extending through the layer of impervious material and having minute openings therethrough to convey a liquid from within the impervious layer into the inclosed recesses, and draining means communicating from said recesses.

2. A hydro-extracting machine including in combination a rotating bowl having an outer cylindrical wall for holding a relatively dense and impervious layer separated by the centrifugal action, and a plurality of walls, each joining with said cylindrical wall at both ends to form an inclosed recess, said walls extending through the layer of impervious material and having minute openings therethrough to convey a liquid from within the impervious layer into the inclosed recesses, and perforations from said chamber through the wall of the bowl for draining the liquid from said chamber.

3. A hydro-extracting machine including in combination a rotating bowl having an outer cylindrical wall for holding a relatively dense and impervious layer separated by the centrifugal action, a perforate chamber extending inwardly from said wall through said layer of impervious material and inclosing a space therefrom, the perforations draining a liquid from within the relatively impervious layer into said chamber, and draining means for said chamber.

4. A hydro-extracting machine including in combination a rotating bowl having an outer cylindrical wall for holding a relatively dense and impervious layer separated by the centrifugal action, a perforate chamber extending inwardly from said wall through said layer of impervious material and inclosing a space therefrom, the perforations draining a liquid from within the relatively impervious layer into said chamber, and perforations from said chamber through the wall of the bowl for draining the liquid from said chamber.

In testimony whereof, I have signed my name to this specification, in the presence of two subscribing witnesses.

TANDY A. BRYSON.

Witnesses:
 DAVID C. PATTON,
 ARTHUR J. CADY.